ELIZA P. WELCH.
Pinking-Irons.

No. 154,736.            Patented Sept. 1, 1874.

Witnesses:
H. A. Daniels
Carroll Webster

Inventor:
Eliza P. Welch,
by M. H. W. I. Howard
her attorneys.

UNITED STATES PATENT OFFICE.

ELIZA P. WELCH, OF GROTON, VERMONT.

IMPROVEMENT IN PINKING-IRONS.

Specification forming part of Letters Patent No. 154,736, dated September 1, 1874; application filed May 20, 1874.

*To all whom it may concern:*

Be it known that I, ELIZA P. WELCH, of Groton, in the county of Caledonia and State of Vermont, have made certain Improvements in Pinking-Irons; and I do hereby declare that the following description, taken in connection with the accompanying drawing, is a full specification of the same.

My invention relates to implements known as pinking-irons; and consists in certain modifications and improvements in the construction of the same, as hereinafter shown and described, the object of this invention being to provide a pinking-utensil suitable for cutting cloth or other proper material, to be operated by hand, like shears or pinchers, the cutting-edge of which does not strike directly on or against a cutter-block or solid surface, as is the case with pinking-irons now in common use.

In the accompanying drawing, which illustrates my invention and forms a part of the specification thereof, corresponding parts being indicated by similar letters—

Figure 1:
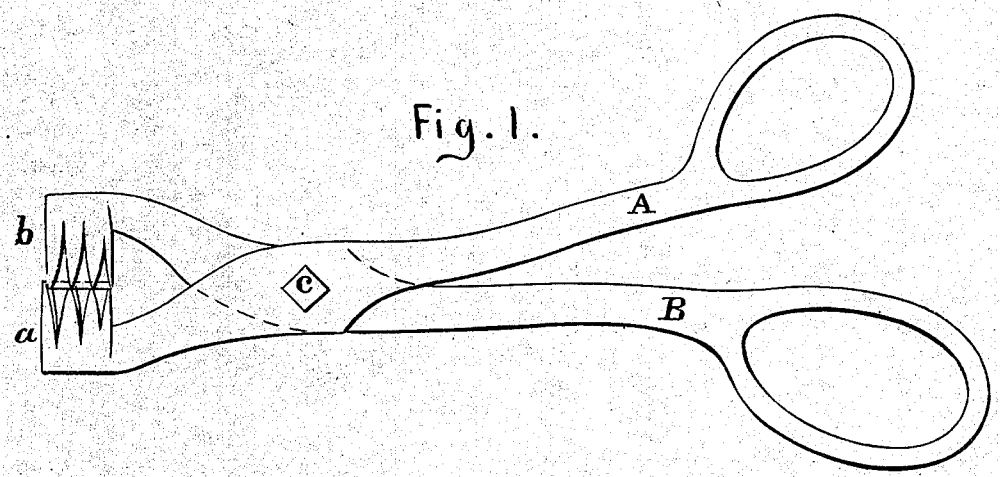
Figure 2:
Figure 3:

Figure 1 represents a side view of my improved pinking-iron. Fig. 2 is a plan of the upper cutting-edge. Fig. 3 is a plan of the lower cutter.

In the drawing referred to, A designates the upper handle or lever, having at its forward extremity the lower cutting-tool $a$, and B indicates the lower handle or lever, on the forward end of which is the upper cutting tool or blade $b$, the said levers being pivoted in the usual manner at $c$. As shown in the drawing, the cutting-tools $a$ and $b$ are semicircular in form, with the edges notched, so that a semicircular zigzag cut is caused by a stroke of the utensil; but the blades may be varied in form, as desired. The upper tool, $b$, is the principal cutting-tool, and the lower tool, $a$, conforms to the tool $b$, but has its edge formed by beveling one side only, as shown in Fig. 3. Both are so constructed that, when the jaws are closed, the edge of the blade $b$ sinks slightly below the surface of the blade $a$, and just back of the same, so that at each stroke the beveled parts of blades $a$ and $b$ bear against each other, and the cutting-edge $b$ does not directly strike anything except the material to be cut.

It is of course understood that for cutting different patterns different styles of tools are required. It is found to be cheaper to use different tools in this way, than to use the same tool with detachable cutters and dies, and also thus to avoid the trouble of having to insert and keep in position the dies, which must, to operate properly, be very accurate in their setting and co-operation.

Having described my invention, I claim and desire to secure by Letters Patent—

A pinking-tool, consisting of the handles A and B, pivoted, and having the upper and lower cutting-tools $b$ and $a$ constructed as described, so that when the jaws are closed the cutting-edge of tool $b$ does not strike the edge of the lower tool, but sinks slightly below it, and the beveled parts of the blades rest against each other, all arranged as and for the purposes specified.

In witness whereof I have hereunto subscribed my name in the presence of two witnesses, this 6th day of May, 1874.

ELIZA P. WELCH.

Witnesses:
  M. E. WELCH,
  JULIA GLOVER.